US009852184B2

(12) United States Patent
Lee et al.

(10) Patent No.: US 9,852,184 B2
(45) Date of Patent: Dec. 26, 2017

(54) PARTITION-AWARE DISTRIBUTED EXECUTION OF WINDOW OPERATOR

(71) Applicants: Boyung Lee, Seoul (KR); Yongsik Yoon, Walldorf (DE)

(72) Inventors: Boyung Lee, Seoul (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 358 days.

(21) Appl. No.: 14/531,209

(22) Filed: Nov. 3, 2014

(65) Prior Publication Data

US 2016/0125032 A1 May 5, 2016

(51) Int. Cl.
*G06F 17/30* (2006.01)

(52) U.S. Cl.
CPC ............... *G06F 17/30486* (2013.01)

(58) Field of Classification Search
CPC ................................. G06F 17/30486
See application file for complete search history.

(56) References Cited

U.S. PATENT DOCUMENTS

| 6,430,550 | B1 | 8/2002 | Leo et al. |
| 6,775,681 | B1 | 8/2004 | Ballamkonda |
| 6,820,095 | B1 * | 11/2004 | Yeung ............... G06F 17/30306 707/642 |
| 6,820,262 | B1 | 11/2004 | Tellez et al. |
| 8,782,100 | B2 | 7/2014 | Yoon et al. |
| 2005/0044102 | A1 * | 2/2005 | Gupta ............... G06F 17/30418 |
| 2006/0190947 | A1 * | 8/2006 | Ghosh .................. G06F 9/5005 719/313 |
| 2008/0133447 | A1 * | 6/2008 | Barsness .......... G06F 17/30595 |
| 2008/0228829 | A1 * | 9/2008 | Crutchfield ....... G06F 17/30554 |
| 2009/0144346 | A1 * | 6/2009 | Duffy ............... G06F 17/30445 |
| 2011/0016160 | A1 | 1/2011 | Zhang |
| 2012/0191699 | A1 * | 7/2012 | George ............. G06F 17/30486 707/718 |
| 2013/0166589 | A1 * | 6/2013 | Baeumges ........ G06F 17/30486 707/769 |
| 2013/0166606 | A1 | 6/2013 | Fricke |
| 2013/0318123 | A1 | 11/2013 | Annapragada |
| 2014/0012877 | A1 * | 1/2014 | Krishnamurthy . G06F 17/30516 707/771 |
| 2014/0214799 | A1 * | 7/2014 | Li ..................... G06F 17/30445 707/718 |
| 2015/0302035 | A1 * | 10/2015 | Raghavan ......... G06F 17/30321 707/741 |
| 2016/0125009 | A1 | 5/2016 | Wu et al. |

OTHER PUBLICATIONS

Pavlo et al., "Skew-Aware Automatic Database Partitioning in Shared-Nothing, Parallel OLTP Systems," SIGMOD '12, May 20-24, 2012, Scottsdale, Arizona, pp. 61-72.

(Continued)

*Primary Examiner* — Leslie Wong
(74) *Attorney, Agent, or Firm* — Klarquist Sparkman, LLP

(57) ABSTRACT

Partition-aware calculation of a window operator can be supported. Different nodes can calculate window function sub-results on database partitions locally, in parallel and independently. Recognition of scenarios in which such parallelism is permissible can be performed. Overall superior performance can result.

15 Claims, 7 Drawing Sheets

(56) References Cited

OTHER PUBLICATIONS

Paulley et al, "Analytic Functions in SQL Anywhere," Jul. 18, 2007, 46 pages.
Hinsberger, "The Window Operator and Window Aggregate Functions," *SAP SQL Anywhere* blog post, Jan. 29, 2014, 4 pages.
"Operators," *Oracle® CEP CQL Language Reference*, oracle.com, Oct. 2009, 17 pages.
Melton, "Information technology—Database languages—SQL—Part 2: Foundation (SQL/Foundation)," Aug. 2003, 1332 pages.
"Window Functions," SAP HANA Reference, help.sap.com, 2012, 2 pages.
"SQL: How does parallelism of a join operation exactly work in a 'shared nothing' architecture?" stackoverflow, Sep. 13, 2012, 2 pages.
White, "Understanding and Using Parallelism in SQL Server," simple talk, Red Gate Software, Mar. 3, 2011, 17 pages.
"Oracle parallel/partition aware SQL tips," Oracle Tips by Burleson Consulting, dba-oracle.com, Jan. 25, 2012, 4 pages.

* cited by examiner

PARTITION-AWARE DISTRIBUTED EXECUTION OF WINDOW OPERATOR

BACKGROUND

Window functions were added to the SQL database standard in 2003. Such functions have a variety of uses and can be implemented by any database system. However, as the size of a database grows, it become more difficult to perform window functions, and performance suffers.

There is therefore room for improvement.

SUMMARY

The Summary is not intended to identify key features or essential features of the claimed subject matter, nor is it intended to be used to limit the scope of the claimed subject matter.

An embodiment can be implemented as a method comprising, for a plurality of database table partitions of a partitioned database table partitioned according to one or more partition columns of the partitioned database table, assigning the database table partitions to respective different nodes for a window calculation specified by a window operator comprising one or more specified partition columns that are the same as or a superset of the partition columns of the partitioned database table; via the database table partitions, calculating window function sub-results locally at the different nodes; and combining the local window function sub-results into an overall window function result of the window operator.

An embodiment can be implemented as a system comprising an input database table comprising a plurality of database table rows comprising a plurality of columns, wherein the input database table is partitioned into a plurality of partitions according to one or more input database table partition columns; a window function calculation orchestrator configured to receive an indication of a window operator comprising one or more specified partition columns of the input database table, wherein the window function calculation orchestrator is configured to assign the partitions to a plurality of respective different nodes; the plurality of different nodes, wherein the plurality of different nodes are configured to accept respective of the partitions and calculate window function sub-results locally for the partitions according to the window operator; and an overall window function result of the window operator constructed from the window function sub-results at the different nodes.

An embodiment can be implemented as one or more computer readable media comprising computer-executable instructions that when executed by a computing system perform a method comprising receiving an indication of a window operator to be performed on a database table, wherein the window operator comprises one or more specified partition columns; determining that the database table is partitioned into a plurality of database table partitions according to one or more actual partition columns that are a subset of or the same as the one or more specified partition columns; responsive to determining that the database table is so partitioned, assigning the database table partitions to respective different machines for local processing; via the database table partitions, calculating window function sub-results according to the window operator locally at the different machines in parallel; and combining the local window function sub-results into an overall window function result of the window operator, wherein the combining comprises performing a UNION operation.

As described herein, a variety of other features and advantages can be incorporated into the technologies as desired.

DETAILED DESCRIPTION

Example 1—Example Overview

The technologies described herein can be used for scenarios involving a window operator. As described herein, partition-aware distributed execution of a window function for the window operator can result in superior performance.

In situations involving input tables that are already partitioned, partitioning of the data can be leveraged via distributed computation, resulting in higher overall throughput.

The technologies can be helpful to improve calculation performance where a window operator is involved. Therefore, the technologies can be included in developer tools, database optimization engines, and the like. End users can benefit from the technologies because they can save time and computing resources.

Figure 1:
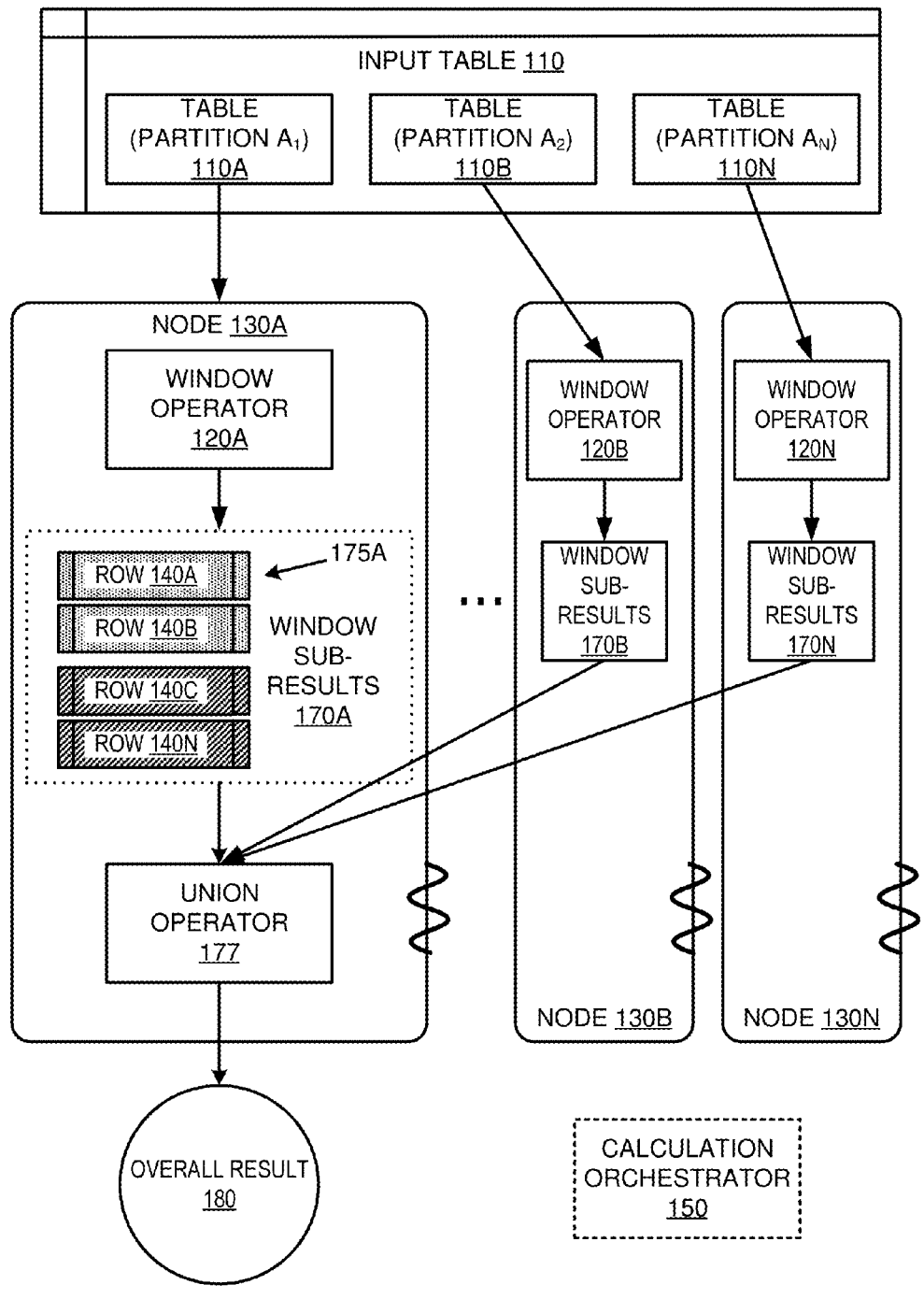
FIG. 1 is a block diagram of an example system implementing partition-aware distributed execution of a window operator.

Example 2—Example System Implementing Partition-Aware Distributed Execution of Window Operator FIG. 1 is a block diagram of an example system 100 implementing partition-aware distributed execution of a window operator as described herein. In the example, a plurality of different nodes 130A-N can calculate the window function in parallel (e.g., the processing is distributed among the nodes 130A-N). Although three nodes are shown, in practice, a larger number of nodes can be used.

In the example, a database table 110 comprises a plurality of columns. The table 110 also comprises a plurality of database table rows 140A-N that have already been arranged (e.g., partitioned) into partitions 110A-N according to one or more partition columns (e.g., via partition keys).

Such a partitioning arrangement can be maintained via any number of database management system techniques. As described herein, a valid parallel execution scenario can be recognized. For example, if the partition columns of the partitioned table are identical to or a subset of the partition columns specified in the window operator, a partition-based distributed execution of the window function for the window operator can be performed.

Such a determination can be made by the calculation orchestrator 150 or may be inherent according to the circumstances (e.g., it is known that the table is partitioned, so a determination need not be made before performing the calculation via the partitions 110A-N).

The rows of the input table 110 can comprise a plurality of columns, including one or more partition columns specified by the window operator. Such columns can be received as part of the window function calculation process (e.g., receiving an indication that a window operator is to be performed on the database table columns).

The window function calculation orchestrator 150 is configured to receive an indication of a window operator comprising one or more specified partition (e.g., "PARTITION BY") columns of the database table. The orchestrator 150 is configured to assign the database table partitions 110A-N to respective of the plurality of different nodes 130A-N (e.g., a per-partition assignment can be followed for the nodes 130A-N).

The nodes 130A-N are configured to accept the partitions and calculate window function sub-results 170A-N locally for the partitions according to the window operator (e.g., as specified in the window operator). The sub-results 170A-N can include an added column 175A in accordance with the window operator (e.g., rank, count, or the like). The different nodes 130A-N can calculate the window function sub-results in parallel via distributed window operator calculators 120A-N as shown.

An overall window function result 180 can be constructed from the window function sub-results 170A-N at the different nodes 130A-N. As shown, a UNION operator 177 can be used to combine sub-results 170A-N into the overall result 180.

In practice, the systems shown herein, such as system 100, can vary in complexity, with additional functionality, more complex components, and the like. For example, additional components can be included to implement security, redundancy, load balancing, report design, single sign on, and the like. In practice, a calculation orchestrator 150 can be distributed among different nodes separate from and/or including the shown nodes 130A-N.

In practice, one of the nodes (e.g., node 130A) can be a master node that also handles orchestration tasks, while the other nodes (e.g., nodes 130B-N) serve as slave nodes that operate as orchestrated.

The system 100 and any of the other systems described herein can be implemented in conjunction with any of the hardware components described herein, such as the computing systems described below (e.g., processing units, memory, and the like). In any of the examples herein, the inputs, outputs, rows, columns, results, and orchestrators can be stored in one or more computer-readable storage media or computer-readable storage devices. The technologies described herein can be generic to the specifics of operating systems or hardware and can be applied in any variety of environments to take advantage of the described features.

Figure 2:
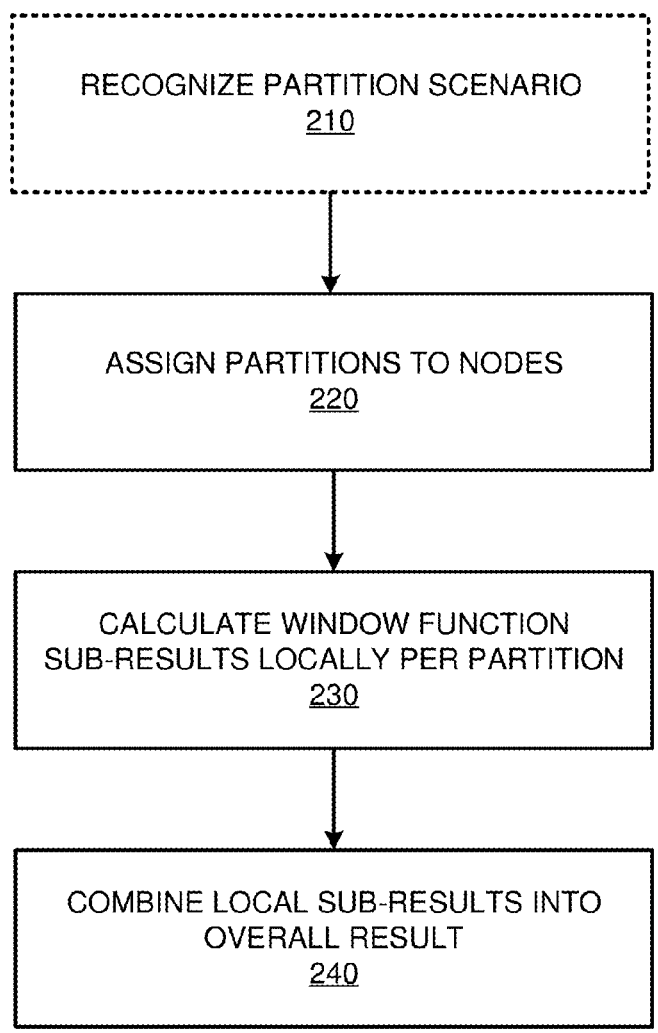
FIG. 2 is a flowchart of an example method of implementing partition-aware distributed execution of a window operator.

Example 3—Example Method Implementing Partition-Aware Distributed Execution of Window Operator FIG. 2 is a flowchart of an example method 200 of implementing partition-aware distributed execution of a window operator and can be implemented, for example, in the system shown in FIG. 1.

At 210, it is recognized that a valid parallel execution scenario exists for the window operator. For example, a matching condition can be evaluated as described herein.

At 220, the database partitions are assigned to respective different nodes for the window calculation specified by the window operator. As described herein, depending on the matching condition, the window operator can comprise one or more partition columns that are the same as or a superset of the partition columns.

The rows of the respective database partitions are assigned to different nodes. As shown, a one-to-one mapping between partitions and nodes or a variant thereof can be used. A node can have multiple partitions, and parallelism can be applied within nodes using the technologies described herein. For example, in a two-level partitioning arrangement, hash partitioning over column A can be divided over multiple nodes in parallel, and range partitioning on column B can be executed in parallel within a node.

The nodes then have respective row groups on which window function sub-results can be independently calculated. As described herein, more than one node executing in parallel (e.g., distributed execution of the window function calculation) can be used to achieve such assignment.

At 230, with the assigned database table rows of the partitions, window function sub-results are calculated locally at the different nodes. As described herein, such a calculation can include sorting the rows and performing the core window function calculation. As described herein, such local calculations, including sorting, can be performed in parallel across the different nodes (e.g., the calculations at one node are performed in parallel with calculation at another node).

Because the rows have already been partitioned in the partitions, local calculations can be performed to generate sub-results that can simply be combined together (e.g., without modifying the row contents). The calculation at one node can be done independently of the calculation done at another, different node (e.g., one calculation does not depend on or interfere with the other).

At 240, the local sub-results are combined into an overall window function result. As described herein, such combination can include unioning (e.g., performing a UNION operation) the local sub-results together into the overall window function result.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Calculation Orchestrator

In any of the examples herein, a window function calculation orchestrator can receive the window operator or a representation of it, and orchestrate execution of the function among a plurality of nodes as shown herein. In practice, the orchestrator can take the form of complied code, interpreted code, just-in-time compilation, or the like. A database management system can include the orchestrator, which can be incorporated into logic and systems for handling other database operators.

Example 5—Example Window Function

In any of the examples herein, the technologies can support a simple window function or a window function with a rich set of features. The syntax of an example Window function in Backus-Naur Form (BNF) is as follows:

```
<window_function> ::= <window_function_type> OVER ( [
PARTITION BY <expression>, . . .] <window_order_by_clause>, . . .
)
      <window_function_type> ::= RANK( ) | DENSE_RANK( ) |
ROW_NUMBER( ) | <lead_lag_function>
      <lead_lag_function> ::= { LEAD | LAG } ( <expression>
[, <offset> [, <default_expression>]] )
      <window_order_by_clause> ::= ORDER BY
{<window_order_by_expression>}
      <window_order_by_expression> ::= <expression> [ASC |
DESC] [NULLS FIRST | NULLS LAST ]
```

The window function allows result sets of a query (or a logical partition of a query) to be divided into groups of rows called a "window partition." A window partition is specified by one or more expressions in the OVER clause.

Window functions such as RANK, DENSE_RANK, ROW_NUMBER, LEAD, LAG have an ORDER BY clause in the OVER clause.

In a typical window function, result sets are first partitioned as specified by the PARTITION BY clause, and then sorted by the ORDER BY clause specification within the window partition. Finally, core window functions are applied to each row within window partition boundaries.

The one or more partition columns of a window function can be specified via the "PARTITION BY" clause in the operator. Similarly, one or more sorting columns can be specified via the "ORDER BY" clause in the operator.

Example 6—Example Valid Parallel Execution Scenario

In any of the examples herein, a valid parallel execution scenario can be detected or recognized. Thus, before assigning the database partitions, it can be recognized that the window calculation specified by a window operator can be performed via parallel processing (e.g., across a plurality of nodes).

For example, a matching condition can be evaluated. Such a matching condition can be between one or more partition columns (e.g., of the partitioned table) and one or more window operator partition columns. Recognizing that the calculation can be performed in parallel can comprise evaluating the matching condition and determining that the matching condition is sufficient to warrant performing the window calculation via parallel processing.

Such a matching condition (e.g., that is sufficient) can be that the one or more input database table partition columns match the one or more specified columns of the window operator (e.g., there is identity between the one or more partition columns and the one or more window operator partition columns).

Or, the matching condition can be that the one or more input database table partition columns are a subset (e.g., a proper subset) of the one or more specified partition columns of the window operator. From a different perspective, the specified partition columns can be a superset (e.g., proper superset) of the actual partition columns. Stated another way, the set of PARTITION BY columns contains the partitioning key for the partitioned tables (e.g., the PARTITION BY are columns {a,b} and the table partitioning key is {a}).

There may be a single particular column by which the database is partitioned, and a single, same column that is specified by the window operator. In practice, more complex arrangements are possible.

Such a condition indicates that distributed processing is possible and the local calculations can be performed independently. Thus, the calculation can be split into multiple window operator sub-calculations as described. The sub-calculations can be isolated to the different nodes as shown herein.

Further, detection of such a condition indicates that the work that would ordinarily be done to implement the PARTITION BY clause of the window operator can be omitted or skipped. In some cases, the partitioning work can be partially skipped (e.g., the data has been partitioned by one column, but partitioning by one or more other columns still needs to be done). In such a case, the further partitioning to fulfill the window operator partition columns that are not partition columns of the partitioned database can be performed locally in parallel across the different nodes.

Figure 3:
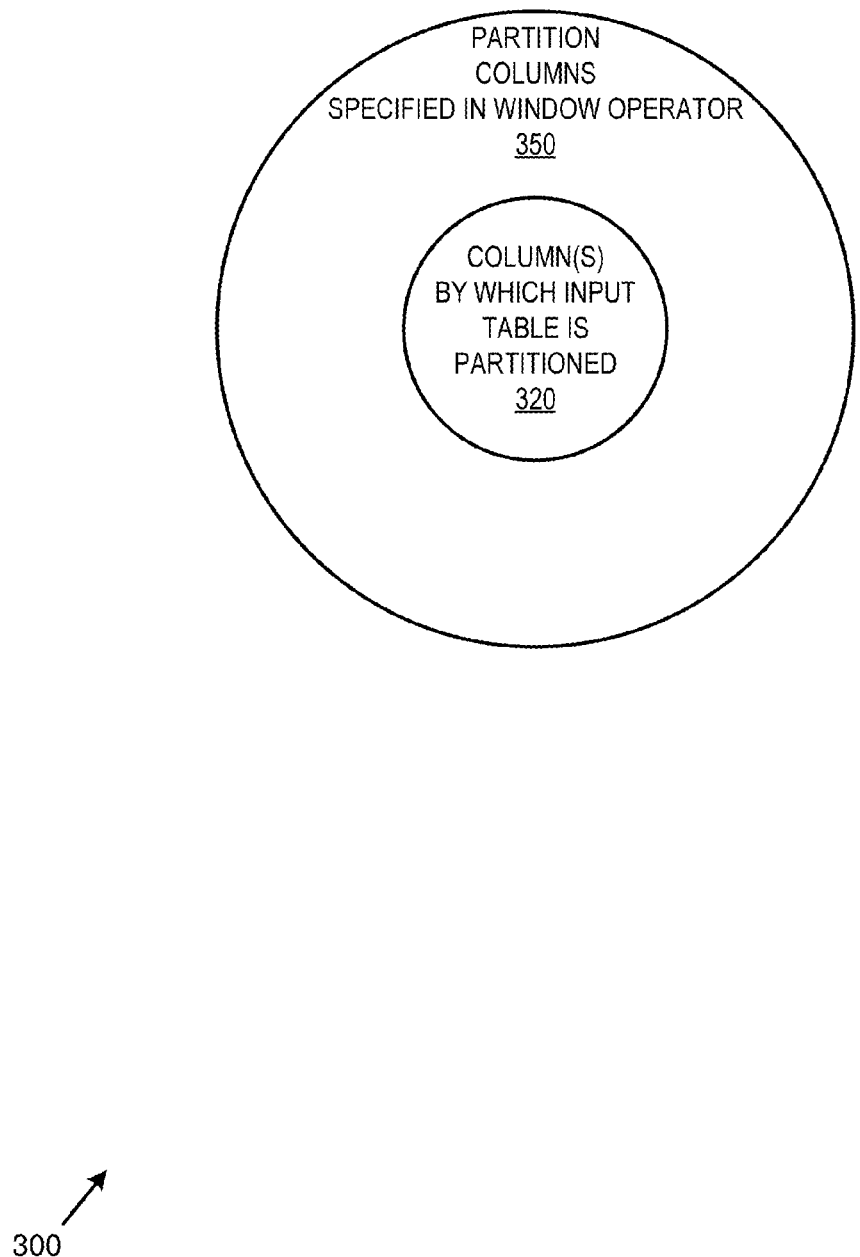
FIG. 3 is a diagram of a matching condition for determining when distributed execution via partition can be performed.

FIG. 3 is a diagram of a matching condition for determining when distributed execution via partition can be performed. In the example, the one or more columns 320 by which the input table are partitioned is a proper subset of the partition columns 350 specified in the window operator. Accordingly, a valid parallel execution scenario is indicated.

Responsive to determining that such a condition is satisfied, the calculation can proceed in parallel as described herein.

Example 7—Example Nodes

In any of the examples herein, a node can take the form of a thread, process, core, machine, machine set, or other entity that executes in parallel with other entities. Such entities can be real or virtual (e.g., hyper-threading can emulate additional cores), but are ultimately executed on real hardware.

Example 8—Example Database

In any of the examples herein, a database can be implemented to be transaction-safe and support enterprise class database features such as point-in-time recovery, backup and restore, and the like. A database can store data organized as a plurality of records in one or more tables.

In practice, a database can be implemented as part of a larger database management system as described herein.

Although the technologies can be applied in any of a number of database environments, an in-memory columnar database such as the HANA database of SAP can be used to implement the described technologies.

Example 9—Example Partitions

In any of the examples herein, different table rows can be placed into different partitions. As described herein, such partitioning can be performed in a variety of ways (e.g., value, range, hash, or the like). Partitioning can ensure that rows having the same values for a partition column are in the same partition, and that the rows having the same value for a partition column are not in different partitions (in a partition by value, range, or hash scenario).

Example 10—Example Window Function Sub-Results

In any of the examples herein, window function sub-results can take the form of partial results of a window function calculation for a window operator. In practice, the resulting rows will have one or more appended or added columns (e.g., rank, count, or the like) depending on what is specified in the window operator.

Such sub-results can be computed independently as described herein. Sub-results can be combined into an overall result of the window function for the window operator via unioning (e.g., concatenating) the sub-results together.

Example 11—Example Window Operator Calculation

Figure 4:
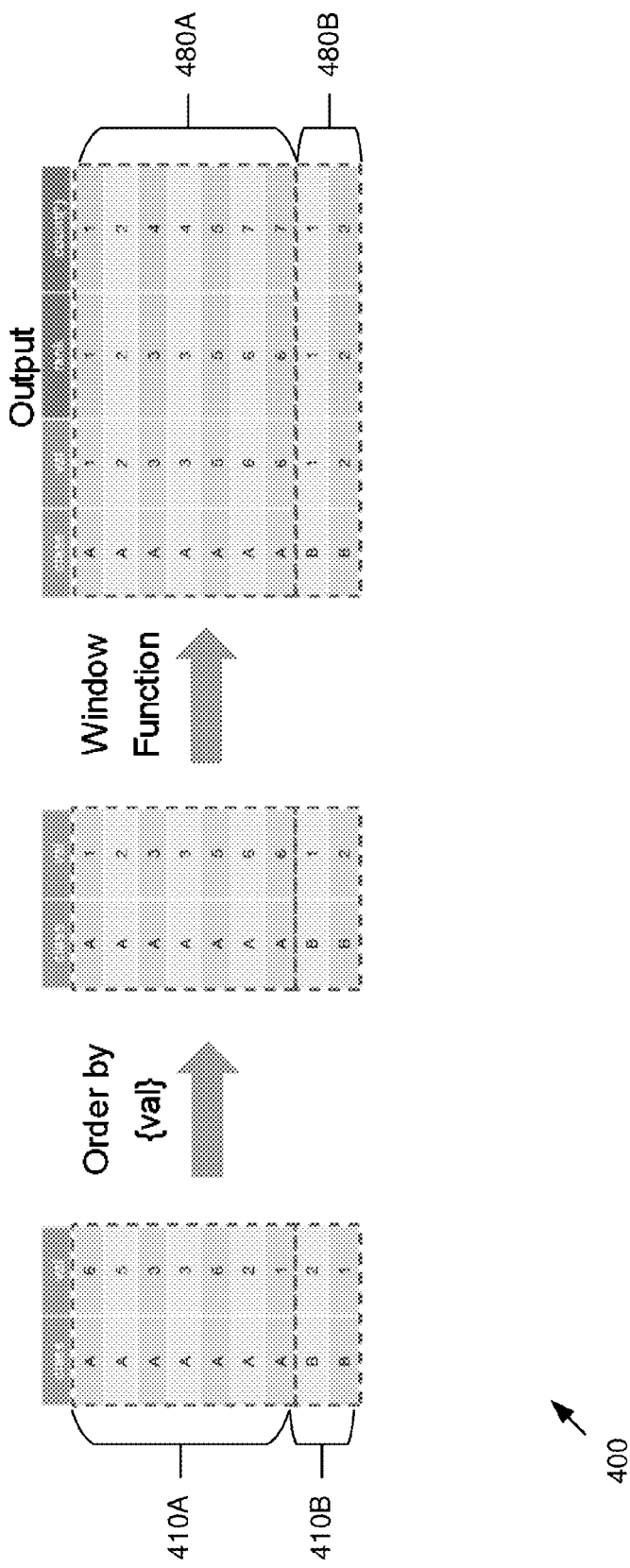
FIG. 4 is an illustration of calculation of a window function of a window operator according to the technologies described herein.

FIG. 4 is an illustration of calculation of a window function of a window operator according to the technologies described herein. In the example, the following query is used to implement the window function.

```
SELECT class, val, rank( ) OVER (PARTITION BY class
ORDER BY val), count(*) OVER (PARTITION BY class
ORDER BY val) FROM Input
```

In the example, value partitioning is used, and the rows are already partitioned by class. So the rows 410A in a first partition having the value "A" for class can be assigned to one node (e.g., node 130A), and the rows 410B in a second partition having the value "B" for class can be assigned to another node (e.g., node 130B).

The rows can then be sorted at the nodes in parallel, and sub-results 480A-B can be calculated in parallel at the nodes. Results 480A-B can then be combined as described herein.

The example is for illustration purposes. In practice, many more rows, values, columns, or the like can be supported.

Example 12—Example Performance Gains

Figure 5:
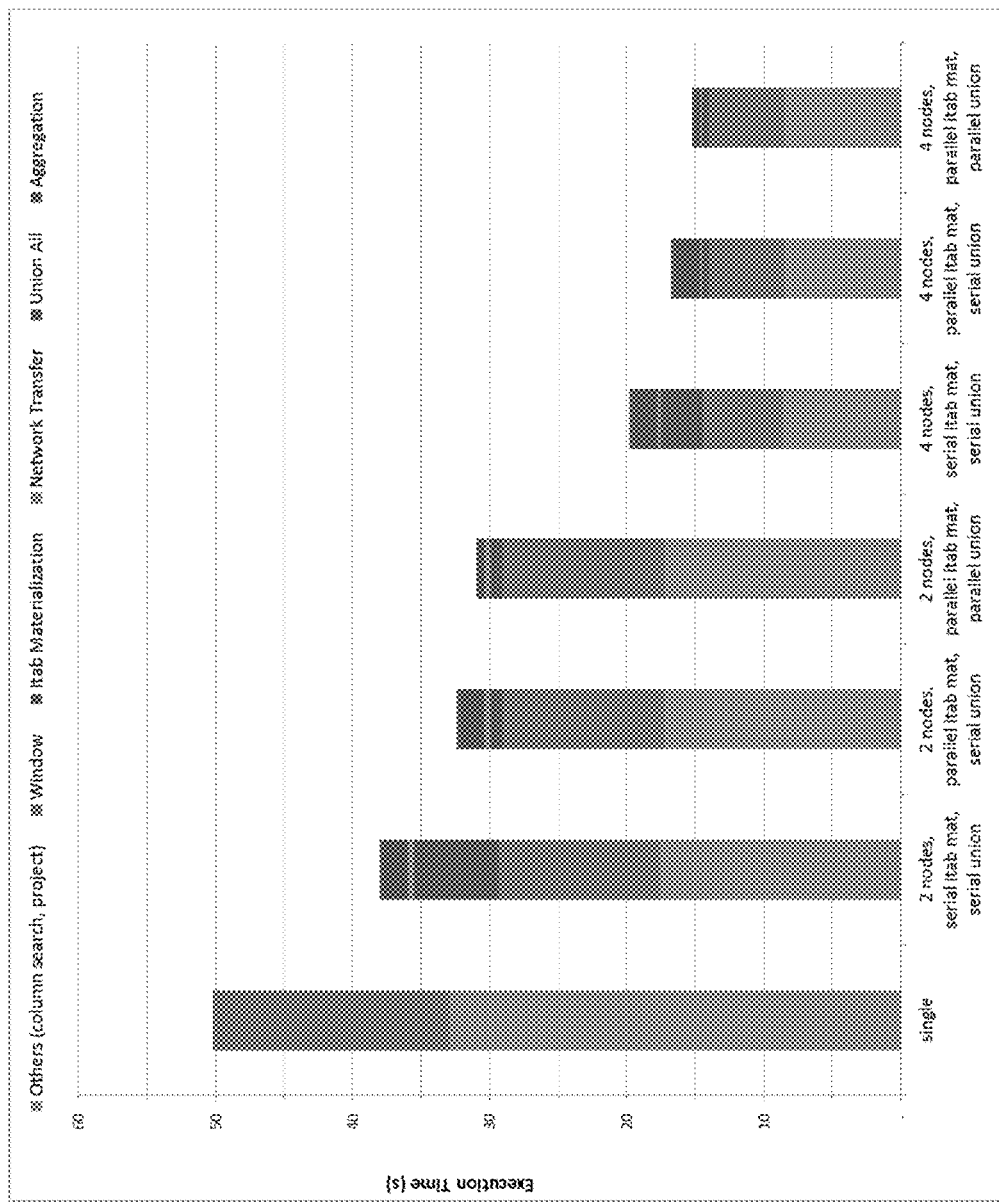
FIG. 5 is a graph showing results of partition-aware distributed execution of a window function calculation.

FIG. 5 is a graph 500 showing results of partition-aware distributed execution of a window function calculation. In the example, the following query was used:

```
select count(*) from
(
    select base_sku
        ,else_sku
        ,relation
        ,std
        ,row_number( ) over (partition by base_sku order by relation desc,
        else_sku) as rn
        from prd.rmd_kk_merge
)as t1
where rn <= 100;
```

In a base table rmd_kk_merge, there were 118,515,984 records. 21,373,388 records resulted from the calculation. Execution time in a single node (not partition aware) compared with various partition-aware scenarios up to four nodes running in parallel and a parallel union is shown in FIG. 5.

Example 13—Example Advantages

As described herein, performance can be greatly improved and overall computation time to compute a window function can be greatly reduced by implementing the technologies described herein.

Example 14—Example Computing Systems

Figure 6:
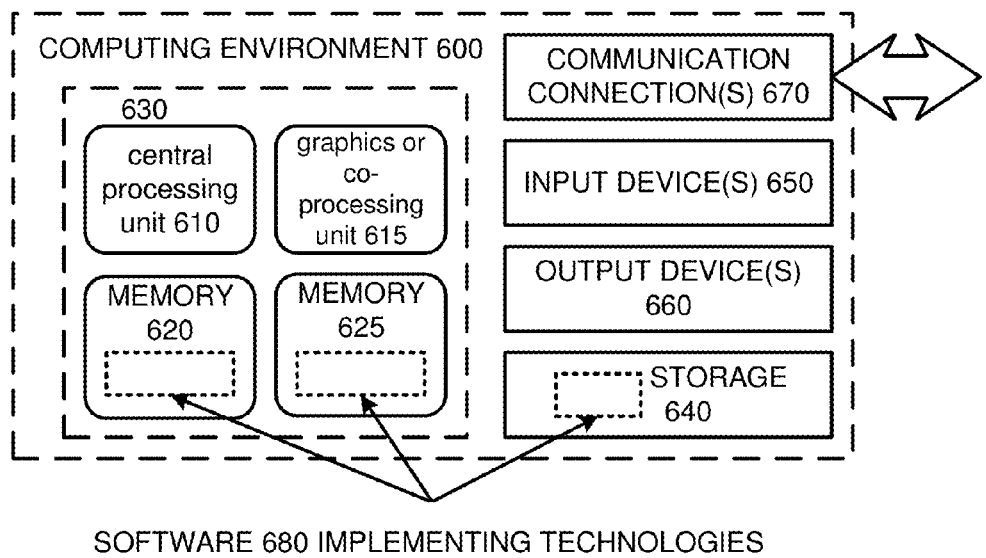
FIG. 6 is a diagram of an example computing system in which described embodiments can be implemented.

FIG. 6 illustrates a generalized example of a suitable computing system 600 in which several of the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Example Cloud-Supported Environment

Figure 7:
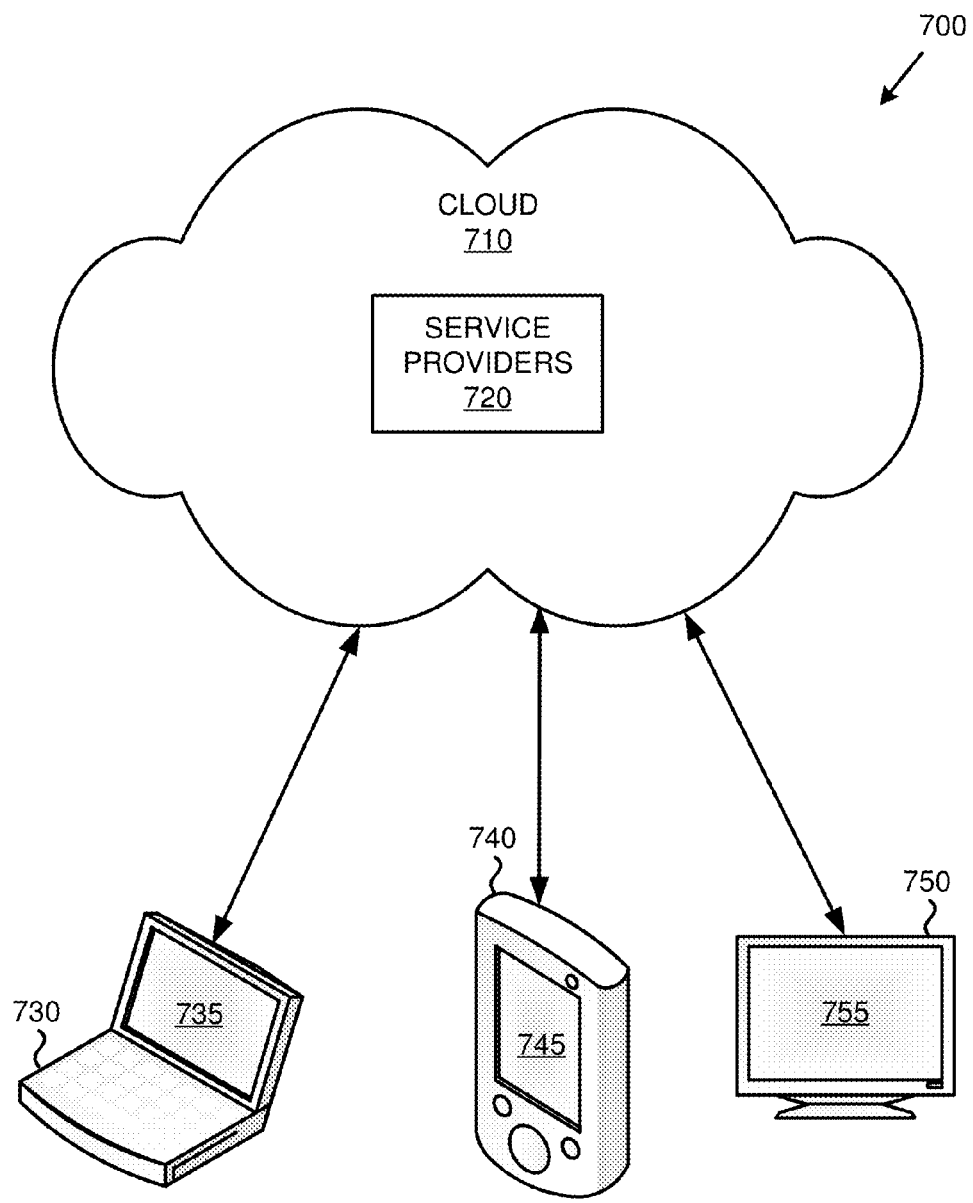
FIG. 7 is an example cloud-support environment that can be used in conjunction with the technologies described herein.

In example environment 700 of FIG. 7, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, and the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touch screen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Example 16—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computer, the method comprising:

for a plurality of database table partitions of a partitioned database table partitioned according to one or more partition columns of the partitioned database table, assigning the database table partitions to respective different nodes for a window calculation specified by a window operator comprising a plurality of specified PARTITION BY partition columns that are a superset of the partition columns of the partitioned database table, wherein the superset comprises one or more PARTITION BY partition columns that are not partition columns of the partitioned database table;

via the database table partitions, calculating window function sub-results locally at the different nodes, wherein further partitioning to fulfill the window operator PARTITION BY partition columns that are not partition columns of the partitioned database table is performed locally in parallel across the different nodes; and combining the local window function sub-results into an overall window function result of the window operator.

2. The method of claim 1, wherein:
the window function sub-results are calculated independently at the different nodes.

3. The method of claim 1, wherein:
the window function sub-results are calculated in parallel across the different nodes.

4. The method of claim 1, wherein:
combining the local window-function sub-results comprises performing a UNION operation.

5. The method of claim 1, further comprising:
before assigning the database table partitions, recognizing that the window calculation specified by a window operator can be performed via parallel processing.

6. The method of claim 5 wherein:
recognizing that the window calculation can be performed via parallel processing comprises:
evaluating a matching condition between the one or more partition columns of the partitioned database table and the plurality of specified PARTITION BY window operator partition columns; and
determining that the matching condition is sufficient to warrant performing the window calculation via parallel processing.

7. The method of claim 6 wherein:
the matching condition comprises a subset relationship between the one or more partition columns of the partitioned database table and the plurality of specified PARTITION BY window operator partition columns.

8. The method of claim 7 wherein:
the one or more partition columns of the partitioned database table are a proper subset of the plurality of specified PARTITION BY window operator partition columns.

9. A system comprising:
an input database table stored in one or more non-transitory computer-readable media and comprising a plurality of database table rows comprising a plurality of columns, wherein the input database table is partitioned into a plurality of partitions according to one or more input database table partition columns;
a window function calculation orchestrator configured to receive an indication of a window operator comprising a plurality of specified PARTITION BY partition columns that are a proper superset of one or more partition columns of the input database table, wherein the window function calculation orchestrator is configured to assign the partitions to a plurality of respective different nodes;
the plurality of different nodes, wherein the plurality of different nodes are configured to accept respective of the partitions and calculate window function sub-results locally for the partitions according to the window operator, and perform further partitioning to fulfill the window operator PARTITION BY partition columns that are not partition columns of the input database table locally in parallel across the different nodes; and
an overall window function result of the window operator constructed from the window function sub-results at the different nodes.

10. The system of claim 9 wherein:
the different nodes calculate the window function sub-results in parallel.

11. The system of claim 9 wherein:
the window function calculation orchestrator is further configured to determine whether a matching condition is satisfied before assigning the partitions.

12. The system of claim 11 wherein:
the matching condition comprises that the one or more input database table partition columns are a subset of the plurality of specified PARTITION BY partition columns of the window operator.

13. The system of claim 12 wherein:
the one or more input database table partition columns are a proper subset of the plurality of specified PARTITION BY partition columns of the window operator.

14. The system of claim 11 wherein:
the window function calculation orchestrator is incorporated into a master node out of the different nodes.

15. One or more computer-readable media comprising computer-executable instructions that when executed by a computing system perform a method comprising:
for a plurality of database table partitions of a partitioned database table partitioned according to one or more partition columns of the partitioned database table, assigning the database table partitions to respective different nodes for a window calculation specified by a window operator comprising a plurality of specified PARTITION BY partition columns that are a superset of the partition columns of the partitioned database table, wherein the superset comprises one or more PARTITION BY partition columns that are not partition columns of the partitioned database table;
via the database table partitions, calculating window function sub-results locally at the different nodes, wherein further partitioning to fulfill the window operator PARTITION BY partition columns that are not partition columns of the partitioned database table is performed locally in parallel across the different nodes; and
combining the local window function sub-results into an overall window function result of the window operator.

\* \* \* \* \*